Patented June 9, 1925.

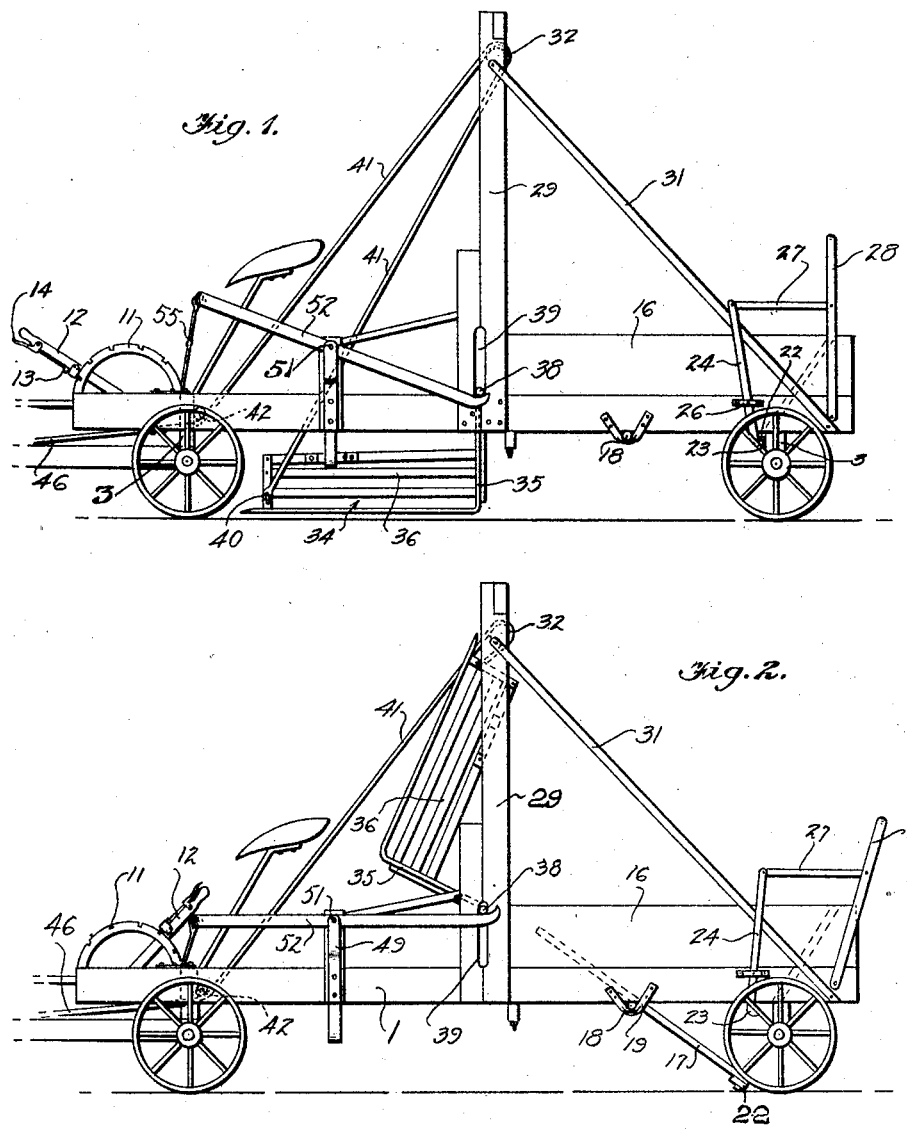

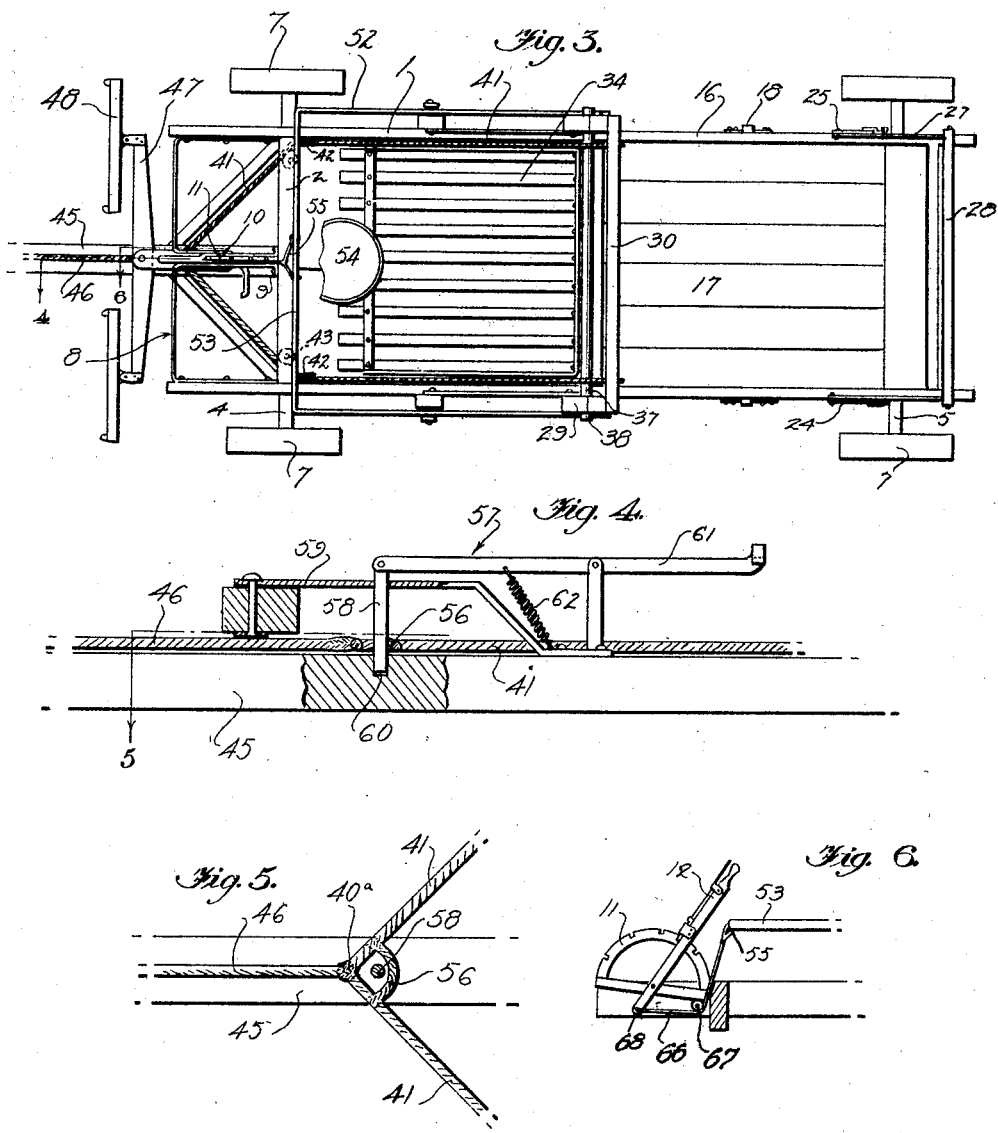

1,540,940

UNITED STATES PATENT OFFICE.

MONTA B. HOWARD AND THOMAS E. DEWEESE, OF MARBLE, ARKANSAS.

LOADER.

Application filed August 10, 1920, Serial No. 402,550. Renewed November 15, 1924.

*To all whom it may concern:*

Be it known that we, MONTA B. HOWARD and THOMAS E. DEWEESE, citizens of the United States, residing at Marble, in the county of Madison and State of Arkansas, have invented certain new and useful Improvements in Loaders, of which the following is a specification.

The present invention has reference to a loading apparatus.

The primary object is to provide on a wheeled device a scoop disposed forwardly of the box thereof, susceptible of varying elevations and inclinations so that the vehicle may be driven over a pile of matter to be loaded into the box of the vehicle, means also being provided for tilting the scoop when in its full elevated position to deposit the matter therein into the box of the vehicle.

A further object is to produce a loading device which includes a wheeled frame having a box or body at the rear thereof, the same being provided with a tilting bottom whereby material in the box may be discharged therefrom, while to the front of the box is a scoop or shovel having means for sustaining the same at different vertical positions with respect to the frame, so that when the vehicle is driven over material to be removed, the said material will be deposited in the scoop or shovel. Another important object of the invention is to provide means for tilting the scoop and which may be used in conjunction with auxiliary draft means for the loader.

A still further object is to produce a loader designed for removing from piles in a roadway, or other place, rock, dirt, stone, gravel, sand, manure, or in fact any other material and for depositing the same in the box or bed of a vehicle whereby the material can be conveyed to a dump or to other places of deposit.

Another object of the invention is to provide a device of the above named character including a scoop or shovel adapted to be operated by a draft animal, the invention also aiming to provide means whereby said draft animal may be used for transporting the loader when he is not being used for elevating the scoop.

The foregoing, and other objects which will appear as the nature of the invention is better understood, may be accomplished by a construction, combination and operative arrangement of parts, such as is illustrated by the drawings. In this connection it is to be understood that the nature of the invention is such as to render the same susceptible to various modifications, especially with respect to size, proportion, etc., but all such changes are to be understood as falling within the scope of the claims.

In the drawings:—

Figure 1 is a side elevation of the invention.

Figure 2 is a similar view illustrating the scoop in a discharging position.

Figure 3 is a top plan.

Figure 4 is a fragmentary longitudinal section taken on the line 4—4 of Figure 3.

Figure 5 is a section taken on the line 5—5 of Figure 4, and

Figure 6 is a section taken on the line 6—6 of Figure 3.

In carrying out our invention we make use of a wheeled body that includes a substantially rectangular frame 1. The longitudinal beams of the frame have their transverse connecting elements adjacent to the ends thereof, and these elements provide the front bolster 2 and the rear bolster 3. The front bolster 2 has its end face arched, or rounded from its center to its ends, and the ends thereof are of a width corresponding to the width of the side members of the frame. Thus the central portion of the front bolster projects a suitable distance below the side members of the frame, while the lower portion of the rear bolster is extended beyond the side members a distance equalling that of the front bolster. The front axle, indicated by the numeral 4 is centrally connected to the front bolster by a king pin or bolt, and the rear axle 5 is secured to the under face of the rear bolster 3 in any desired or preferred manner, while on both the front and rear axles are journaled wheels 7.

By reference to the drawings it will be noted that the front bolster 2 is set back a considerable distance from the outer ends of the side members of the frame, and also that suitable brace members 8 are disposed between the outer face of the front bolster and the projecting ends of the side members of the frame. Two of these brace members are employed, each including an offset portion which is bolted or otherwise secured to the outer face of the bolster 2, as indicated by the numeral 9 and from these secured portions each of the braces is provided with an outwardly extending portion 10. The portions 10 are spaced a suitable distance away from each other, but may be brought together at their outer ends, and at their said outer ends brace members are provided with angle arms directed toward the side members of the frame and secured to the inner faces of the said side members. One of the portions of one of the braces carries a segmental toothed rack 11. Between the portions 10 there is pivoted, a lever 12. On the lever is a spring pressed dog 13 designed to engage between the teeth of the rack 11, and this dog is operated by a handle member 14 that is pivoted adjacent to the outer end of the lever 12.

At a suitable distance rearwardly of the front bolster 2, the frame 1 is provided with a box or bed 16. The bottom 17 has its side edges, at oppositely disposed points provided with outwardly projecting trunnions 18, which are received in bearings 19 that are secured to and depend from the sides of the frame 1.

Adjacent the rear end of the bottom 17 lateral lugs 22 project from the sides of the bottom. These lugs on the opposite sides of the bottom are engaged by hooks 23 on the lower ends of bars 24 and 25 respectively. Each of the bars is pivoted to the box or bed as at 26. The upper ends of the bars 24 and 25 are pivotally connected to links 27 which are pivotally connected to a U-shaped operating member 28. By grasping the operating element 28 and pulling the same in an outward direction, the hooks 23 of both the bars 24 and 25 will be released from engagement with the lugs 22 of the bottom 17, permitting the said bottom to swing by gravity and thus allow a load in the box or bed to be discharged therefrom.

Approximately in a line with the inner end of the box or bed 16 the side members of the frame 1 have secured thereto standards 29. These standards have their upper ends connected by a cross beam 30, and if desired, suitable bracing means may be provided between the standards and the beam 30. In any event angle braces 31 are provided between the standards and the rear portion of the frame 1.

To the beam 30 slightly inward of the standards 29 there are mounted pulleys 32.

At the front of the box or bed 16, between the side members of the frame, and slightly inward of the front bolster 2, there is arranged a scoop or shovel, broadly indicated by the numeral 34. This scoop or shovel includes a bottom member, preferably provided with sides and with a back. For distinction the back is indicated by the numeral 35 and comprises a straight member that may rest against the front face of the box or bed, or be spaced slightly outward of the said box or bed. The scoop or shovel may comprise a solid member, or may be slatted. As a matter of fact we prefer to construct the scoop both as slatted and solid members which are interchangeable to accord with the class of material to be gathered thereon. For instance when gathering dirt, sand or gravel, a solid scoop is desired, while for gathering rock and stone, a slatted scoop is preferable.

Also for the distinction the side members of the scoop are indicated by the numeral 36, and on these sides, adjacent to the back of the scoop there are outwardly extending preferably cross sectionally rounded lugs 37. On each of the lugs there is arranged an anti-friction roller 38, and these rollers are received in elongated vertically disposed slots or openings 39 in the lower and widened portions of the standards 29.

To the sides 36 of the scoop 34 there are secured, as at 40, cables 41—41. Each of the cables is trained up and over one of the pulleys 32, and is from thence directed under a sheave wheel 42 which may be secured to the rear face of the front bolster 2, and from thence over a horizontally disposed sheave wheel 43 that is secured to the under face of the front bolster, adjacent to the reduced ends thereof. The cables 41 are then directed toward each other to be joined as at 40ª and continued as a single cable 46. This extension is guided along the wagon pole 45 and is designed to be attached to a single tree secured on the tugs of a draft animal, and it will be apparent that by causing the animal to advance with the vehicle standing still a pull on the cable will raise the scoop until the rollers thereof contact with the upper walls provided by the slots 39 in the standards 29, and a further pull will cause the scoop to be tilted rearwardly in the direction of the box or bed 16 so that material gathered in the scoop will be deposited in the box or bed. On the wagon pole, which is, of course, connected to the front axle 4 and braced thereto in the usual manner, there is a double tree 47 to which is pivoted the single trees 48 for the draft animals.

A loop 56 is formed by the cables 41 at their juncture with the single cable 46 whereby a retaining mechanism indicated by the numeral 57 may releasably retain the cables 41 and 46 fixed relative to the frame thereby making it possible to use a draft animal hitched to the cable 46 for assisting in drawing the machine from place to place. This mechanism consists of a movable member 58 which reciprocates through an opening in a bracket 57 secured to the tongue 45, while the free end of the member 58 is adapted to seat within a pocket or recess 60 provided in the tongue 45. The upper end of the reciprocating member 58 is connected to a lever 61 and a spring 62 is connected to the forward end thereof and to the tongue 45 to normally urge the member 58 in the pocket 60 of the tongue.

When the movable member 58 is in the position shown in Figure 4, to extend through the loop 56, it will be seen that the draft animal connected with the cable 46 will assist in transporting the loader. However, when it is desired to use this draft animal for elevating and swinging the scoop, the lever 61 is actuated to withdraw the member 58 from its socket 60 and from the loop 56, thereby permitting the draft animal to hold the cable 41 forward of the loader to elevate and swing the scoop so that it may discharge its contents into the wagon bed.

It is highly desirable, of not essential that the scoop be sustained at varying heights for properly receiving thereon the material to be deposited in the box or bed, and to accomplish this we secure on the side members of the frame, forward of the standards 29, oppositely disposed upstanding posts 49, and pivoted thereto as at 51, are the side members 52 of a yoke 53. The side members or arms of the yoke are of a length to at all times underlie the roller bearings 38 on the lugs 37. The connecting member for the arms of the yoke is disposed inwardly of the lever 12, and the seat for the driver, indicated by the numeral 54 is disposed inward of the said connecting member, and, of course, between the arms of the yoke. To the connecting member of the yoke there is secured the angle strands 55 of a strong flexible element 66. This element 66 is trained under a sheave wheel 67 secured to the outer face of the front bolster 2, and has its end preferably adjustably connected to the lower end of the lever 12, as indicated by the numeral 68. It will be apparent that a pull on the lever, in a direction toward the bed of the vehicle, will cause the outer end of the yoke 53 to swing downwardly toward the frame, elevating the rear portion of the arms thereof which contacting with the rollers 38 will swing the scoop upwardly. The connection between the scoop and the cable 41 serves as a fulcrum so that by operating the lever 12 the scoop is not only elevated to desired positions, but is also sustained at an inclination. The dog 14 engaging with the toothed rack 11 sustains the scoop elevated, and it will be apparent that the scoop can be raised and dumped by the operation of the cable without interfering with the engagement of the anti-frictional lugs or trunnions thereof by the yoke 53, or without changing the position of the lever 2.

It is thought that the foregoing description, when taken in connection with the drawings will fully set forth the construction, method of operation and advantages of the improvement to those skilled in the art to which such inventions relate.

Having thus described the invention, what we claim is:—

1. A wheeled frame having a box at the rear thereof, a scoop disposed at the front of the box, lugs thereon, guides carried by the frame and receiving said lugs and designed to permit of a limited vertical movement of the scoop with respect to the frame, pivoted means contacting with said lugs, whereby to raise and sustain the scoop at varying elevations, cable operated means for further elevating the scoop to bring the lugs thereof to the upper extremity of the bearings and for further causing the tilting of the scoop in the direction of the box.

2. A vehicle including a bottom frame having a box at the rear thereof, a scoop arranged forward of the box, slotted standards on the sides of the frame and a connecting member therefor, a pulley block on said member, lugs on the sides of the scoop, said lugs being slidably received in the slots of the standards, a cable secured to a side of the scoop and trained around the pulley block, and the outer end of the cable designed to be connected to a draft animal, and lever operated means for elevating and sustaining the scoop, independent of the cable.

3. In a device of the character described, a movable scoop, a flexible element connected thereto and adapted to operate the scoop, said flexible element having a loop therein adapted to be connected to a draft means, and a retaining mechanism adapted for engagement with the loop to maintain said flexible element fixed relative to the device whereby the flexible element may be used for drawing the device.

4. In a device of the class described, a wheeled frame having upright guides at the opposite sides thereof, a vertical movable scoop, lugs on the rear end of the scoop for co-operation with said guides, means engaging and normally supporting the lugs, operating means for actuating said lugs for bodily elevating the scoop, and independent means connected to the front end of the scoop for causing the same to rock on said lugs.

5. In a device of the character described, a wheeled frame, standards rising from opposite sides thereof and provided with guide slots, a scoop having projections at its rear end extending from the side thereof and adapted to be received in said slots, fulcrumed means engagable with said projections for elevating the scoop, and means connected to the forward end of the scoop for tilting the same to cause discharge from the scoop.

In testimony whereof we affix our signatures in presence of two witnesses.

MONTA B. HOWARD.
THOMAS E. DEWEESE.

Witnesses:
J. A. LITTLE,
L. W. FLOYD.